United States Patent [19]

Schulte et al.

[11] Patent Number: 4,913,969

[45] Date of Patent: Apr. 3, 1990

[54] PROCESS FOR BONDING SUBSTRATES IMPERMEABLE TO WATER VAPOR

[75] Inventors: Heinz-Guenther Schulte, Muelheim; Guenter Tauber, Duesseldorf; Wolfgang Pille-Wolf, Hilden, all of Fed. Rep. of Germany

[73] Assignee: Henkel Kommanditgesellschaft auf Aktien, Duesseldorf, Fed. Rep. of Germany

[21] Appl. No.: 221,964

[22] Filed: Jul. 20, 1988

[30] Foreign Application Priority Data

Jul. 20, 1987 [DE] Fed. Rep. of Germany ....... 3723923

[51] Int. Cl.$^4$ .............................. B32B 7/04; C09J 5/04
[52] U.S. Cl. .................................... 428/420; 156/276; 156/281; 156/307.3; 156/314; 156/319; 252/194; 427/333; 427/340; 427/341
[58] Field of Search ............... 156/314, 276, 319, 281, 156/307.3; 427/333, 341, 340; 428/420; 252/194

[56] References Cited

U.S. PATENT DOCUMENTS

| 4,008,170 | 2/1977 | Alla | 252/194 |
| 4,181,557 | 1/1980 | Foggett et al. | 156/319 |
| 4,372,799 | 2/1983 | Rajmussen | 156/319 |
| 4,453,997 | 6/1984 | Hori et al. | 156/305 |

FOREIGN PATENT DOCUMENTS 3412884  11/1984  Fed. Rep. of Germany .

*Primary Examiner*—John J. Gallagher
*Attorney, Agent, or Firm*—Ernest G. Szoke; Wayne C. Jaeschke; Daniel S. Ortiz

[57] ABSTRACT

A process for improving the bonding of hotmelt materials which post crosslink in the presence of moisture, to water vapor impermeable substrates by applying an activator material, which release bound water at the hotmelt application temperature, to at least one of the water vapor impermeable substrates.

52 Claims, No Drawings

4,913,969

PROCESS FOR BONDING SUBSTRATES IMPERMEABLE TO WATER VAPOR

BACKGROUND OF THE INVENTION

1. Field of the Invention

The invention relates to a process for bonding and sealing substrates impermeable to water vapor with hotmelt adhesives or sealing compounds which post crosslink in the presence of moisture.

2. Statement of Related Art

Hotmelt adhesives are enjoying increasing popularity in the bonding field. They are solventless, and can be handled without pollution problems. In addition, they are suitable for production processes with short cycle times. The original disadvantage of hotmelt adhesives, namely the poor bond strength at elevated temperature, has recently been overcome by using as hotmelt adhesives reactive systems which when melted, react to provide materials which cannot be melted a second time or can be melted only at a much higher temperature.

One particularly important group of such a reactive hotmelt adhesives are the moisture-crosslinking hotmelts. Moisture-crosslinking hotmelts are generally understood to be solventless adhesives which, after application to a substrate, acquire their ultimate strength and thermal stability under load by subsequent hardening by the action of water.

It is also known that moisture-hardening hotmelts can be obtained by reacting free NCO groups of prepolymers with α-aminoalkyl trialkoxylsilanes, in which case the hardening reaction takes place through the terminal $Si(OR)_3$ groups, cf. H. F. Huber, H. Müller, 11th Münchener Klebstoff- und Veredelungsseminar, Octobar 1986. This lecture also disclosed a moisture-hardening hotmelt synthesized from a polyester containing free OH groups by initially reacting the OH groups with polyfunctional isocyanates in excess. The free NCO groups then present are subsequently reacted with α-aminoalkyl trialkoxysilanes to form materials known as silane hotmelts.

However, one disadvantage of hotmelt adhesives which require the presence of water, is that the hardening reaction cannot take place completely, if at all, if the substrates to be bonded are impermeable to water vapor. Accordingly, an attempt has been made (DE-A 34 12 884) to overcome this deficiency by using a primer consisting essentially of a solution of hexamethylene tetramine in acetone. However, the use of such a primer generally gives unsatisfactory results, particularly in the case of silane- or siloxane-crosslinking systems. In addition, in practice the amine emits an unpleasant odor.

Similar problems exist in the field of joint sealing compounds. An important group of joint sealing compounds are the mixtures containing polyurethane prepolymers which require the presence of and contact with atmospheric moisture to post-crosslink and harden. The polyurethane prepolymers used in polyurethane joint sealing compounds correspond, in their basic structure, to the polyurethane prepolymrs which are used for hotmelts.

In the application of polyurethane joint sealing compounds which post-crosslink in the presence of moisture, inadequate hardening or unsatisfactorily long hardening times are obtained when the joints to be sealed are bounded by substrates impermeable to water vapor.

BRIEF SUMMARY OF THE INVENTION

The present invention is a process which enables substrates impermeable to water vapor to be satisfactorily bonded with hotmelts which post-crosslink in the presence of moisture. The process also enables joints which are bounded by impermeable surfaces to be sealed with joint sealing compounds which post-crosslink, in the presence of and contact with moisture.

In accordance with the present invention a process for bonding and/or sealing substrates impermeable to water vapor with hotmelts or hotmelt joint sealing compounds which post-crosslink in the presence of moisture wherein is provided a solid activator material suspended or dissolved in a liquid is applied to at least one of the substrate surfaces to be bonded, the liquid present is subsequently removed and a hotmelt or a joint sealing compound is then applied to the at least one substrate surface. In the case of joining materials by adhesive bonding a second substrate is generally placed over the hotmelt adhesive applied to the at least one substrate surface and the two substrates are urged together. When used in a sealing application, the hot melt sealant is introduced into a space between the impermeable bounding surface at least one of which carries the activator material. The hotmelt material is applied in a softened or molten condition at an elevated temperature. In both the adhesive bonding and the sealing application the hotmelt material bonds to the substrate. As used herein bonding will be used to describe the adhesive and sealing application of the hotmelt material and will refer to the hotmelt sealant or adhesive bonding to the substrate.

The activator material is a substance capable of releasing chemically or adsorptively bound water at the hotmelt application temperature.

DETAILED DESCRIPTION OF THE INVENTION

Other than in the operating examples, or where otherwise indicated, all numbers expressing quantities of ingredients or reaction conditions used herein are to be understood as modified in all instances by the term "about".

Substances which release between 0.5 and 25% by weight and preferably between 1 and 10% by weight bound water are suitable as activator material for the process according to the invention. Both inorganic and organic substances which contain water in physically or chemicaly bund form and which release it again at room temperature or on heating may be used as the activator material for the process of the invention.

Suitable inorganic activator materials for the process according to the invention are air-dried oxides, hydroxides or salts containing water of crystalization of the alkali metals, alkaline earth metals and metals of the third main group and also air dried oxides, hydroxides or salts containing water of crystallization of secondary group elements. Substances which release water of crystallization at a temperature in the range from 80° to 180° C. and which are readily available in relatively large quantities are preferred materials.

Metals of the third main group comprise metals from Group IIIA and the secondary group elements comprise the elements of Groups, IB, IIB, IIIB, IVB, VB, VIB, VIIB, VIIIB of the PERIODIC CHART OF THE ELEMENTS, MERCK INDEX, TENTH EDITION, Merck & Co., Inc. 1983. Preferred compounds of these groups comprise air dried oxides, hydroxides and salts containing water of crystallization of copper, iron, vanadum, chromium, molybdenum, tungsten, manganese, cobalt, nickel, zinc, cadmium and aluminum.

Another criterion for the selection of the activator material is that the substances should be compatible with the hotmelt adhesive and the materials being joined. Particularly preferred metal salts containing water of crystallization useful in the process of the invention are iron sulfate ($FeSO_4 \times 7\ H_2O$), barium hydroxide ($Ba(OH)_2 \times 8\ H_2O$), calcium sulfate ($CaSO_4 \times 2\ H_2O$), copper sulfate ($CuSO_4 \times 5\ H_2O$), magnesium phosphate ($(Mg)_3(PO_4)_2 \times 4\ H_2O$), sodium silicate ($Na_2SiO_3 \times 9\ H_2O$), copper acetate ($Cu(CH_3COO)_2 \times 2\ H_2O$), sodium carbonate ($Na_2SiO_3 \times 12\ H_2O$), sodium phosphate ($Na_3PO_4 \times 13\ H_2O$), sodium sulfate ($Na_2SO_4 \times 10\ H_2O$), calcium lactate ($Ca(CH_3-CH(OH)-COO)_2 \times 5\ H_2O$).

Another class of substances which are useful as activator materials in the process of the invention are inorganic compounds which form structures containing voids or passages in which water is bound or incorporated at room temperature and which release the bound or incorporated water above room temperature or in vacuo. Examples of preferred substances are zeolites which are normally used as ion exchanger materials or molecular sieves. Within this group, zeolite A is particularly preferred.

In another embodiment of the process according to the invention, hydrophilic polymers containing bound water are used as the activator material. Preferred substances of this type are cellulose derivatives, starch derivatives, polyacrylamide and/or polyvinylpyrrolidone.

In the process according to the invention, the activator material is preferably applied as a solution or suspension in a liquid to at least one of the substrate surfaces to be bonded. As used in the present invention, suspensions are understood to be systems of one or more liquids and insoluble solid particles. The systems in question are not intended to be limited in regard to the size of the insoluble solid particles as is often expressed by the deliberate choice of such different expressions as suspensions, dispersions or colloidal solutions. The choice of a suitable solvent is dependent on the solubility properties of the activator material. Water is preferably used for the preparation of dispersions of water-insoluble activator materials or solutions of water-soluble activator materials. The corresponding aqueous solutions or disperions of the activtor material contain 1 to 90, preferably 10 to 50 and more preferably 10 to 20% by weight of activator material.

Aliphatic $C_1-C_5$ alcohols or aliphatic $C_3-C_5$ ketones are preferably used as organic dispersants or solvents for the activator material. Particularly preferred organic solvents or dispersants are acetone and propanol.

In cases where the activator material is to be applied to the substrate surface as a dispersion in a liquid, the dispersion may contain additional substances. The additional substances can serve both as stabilizers to improve the storability of the dispersion and also as viscosity regulators for the dispersion to obtain better application of the dispersion to the substrate surfaces to be bonded. Preferred stabilizers for aqueous dispersions are water-soluble polymers having a thickening effect, more especially cellulose ethers or polyvinyl alcohol. Polymers soluble in the particular solvent may be added to improve the storability of dispersions in organic solvents and as thickeners for regulating viscosity. Preferred stabilizers are cellulose esters, for example cellulose acetobutyrate.

Silica may also be used in the process according to the invention as a thickener for dispersions of the activator material.

In one preferred embodiment of the process according to the invention, the activator material is applied in a manner and amount so that at least 50% of the substrate surface to be bonded is not covered with activator material. In one particularly preferred embodiment, the substrate surface to be bonded, not covered with activator material, makes up more than 80% of the total substrate surface to be bonded.

The activator materials may be a solid. If it is directly used in this form in the process according to the invention, the desired surface coverage may be controlled through the quantity of material applied.

In another embodiment of the process according to the invention, the activator material is applied to the substrate surface to be bonded as a dispersion in a solvent. In this case, the coverage of the substrate surface to be bonded with the activator material may be controlled both through the quantity of dispersion applied and also through the quantity of activator material in the dispersion.

In another embodiment of the process according to the invention, the activator material is applied to the substrate surface to be bonded, in solution in a solvent. In this case, too, the coverage on the substrate surface to be bonded may be controlled both through the concentration of activator material in the solution and also through the quantity of solution applied to the substrate surface. The coverage may also be controlled by applying the solution of activator material in a pattern of discrete droplets which form islands of activator material on a sea of substrate surface.

In another preferred embodiment, the activator material is applied to the substrate surace to be bonded initially in anhydrous form as a solid or in a dispersion in an organic solvent. The substrate surface covered with the anhydrous activator material is then stored in air, optionally after removal of the solvent by drying. The activator material takes up the quantity of water, required for the process according to the invention from the air. Only then is the hotmelt or joint sealing compound applied to the substrate surfaces.

The process according to the invention may be used to increase the bond strength of virtually all moisture-cross-linking hotmelts and joint sealing compounds on substrates impermeable to water vapor.

Accordingly, the present invention is not confined to the hotmelts and joint sealing compounds exemplified in the following preferred embodiments.

Known moisture-hardening hotmelts are thermoplastic polymers containing terminal isocyanate and/or silane and/or siloxane groups. Polyurethane hotmelts are normally prepared by reaction of polyols with an excess of diisocyanates in the absence of moisture. In most cases, aromatic diisocyanates are used as the diisocyanate component in the synthesis of polyurethanes. Examples of suitable aromatic diisocyanates are 2,4-tolylene diisocyanate, 2,6-tolylene diisocyanate, isomer mixtures of 2,4- and 2,6-tolylene diisocyanate, diphenylmethane-4,4'-diisocyanate and 1,5-naphthylene diisocyanate. By contrast, aliphatic diisocyanates, such as 1,6-hexane diisocyanate, play a much smaller role.

The polyisocyanates used are such compounds as triphenylmethane-4,4',4''-triisocyanate and tris-(4-isocyanato phenyl)-thiophosphate. A number of isocyanate components for polyurethane adhesives are commercially available.

Suitable polyols are both low molecular weight compounds and also compounds of relatively high molecular weight. Examples of low molecular weight compounds are glycols, glycerol, butanediol and trimethylolpropane. Polyethers or polyester polyols are normally used as the polyols of relatively high molecular weight. Starting materials for example, adipic acid, phthalic acid, butylene glycol, glycerol and hexanetriol, linear polyester polyols may be prepared by reaction of adipic acid with ethylene glycol.

Another class of polyester-based polyols may be obtained on the basis of hydroxyl-containing polyacrylate. Polyether polyols may be prepared by reaction of epoxides with alcohols. The alcohols used may be, for example ethylene glycol, diethylene glycol, propylene glycol, glycerol, trimethylolpropane, pentaerythritol, sorbitol, mannitol, sucrose and alkyl glucosides. The epoxides used may be, for example, ethylene oxide, propylene oxide, butylene oxide, styrene oxide, cyclohexene oxide, trichloorbutylene oxide and epichlorohydrin. Instead of an epoxide, however, tetrahydrofuran may also be used. In addition to polyethers and polyesters, natural substances, for example castor oil, may also be used as the polyol component. A number of polyether polyols and polyester polyols, including types specifically intended for the preparation of polyurethanes, are commercially available.

The irreversible hardening of the adhesive begins when the polyurethane hotmelt comes into contact with moisture. In the prior art the polyurethane hotmelt was contacted by atmospheric moisture. In the process according to the invention, the hotmelt is also contacted with water released from the activator.

At the 11th Münchener Klebstoff- and Veredelungs-Seminar, October 1986, H. Huber and H. Müller reported on moisture-hardening hotmelts obtained by reaction of free NCO groups of prepolymers with aminoalkyl trialkoxysilanes. In this case, the moisture-induced hardening process takes place by reaction of the terminal trialkoxysilane groups to siloxane groups. As an example of moisture-hardening silane hotmelts, disclosed at the seminar were compounds synthesized from a polyester containing free OH goups which are first reacted with polyfunctional isocyanates in excess and the free NCO groups present thereafter subsequently reacted with aminoalkyl trialkoxysilanes.

Moisture-crosslinking hotmelts of the type described in U.S. Ser. No. 189,904 are particularly preferred for use in the process of the present invention. The preferred hotmelts are silanized polyamides which can be obtained: by reaction of a diisocyanate of the formula

with an alkoxyalkyleneamino or mercaptosilane of the formulae IIa and IIb below

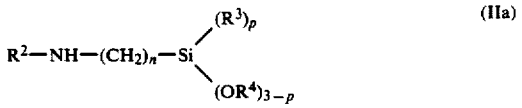

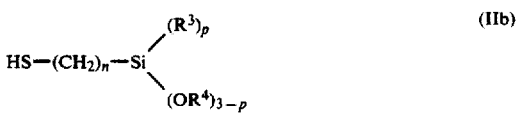

Urea derivatives of the formula

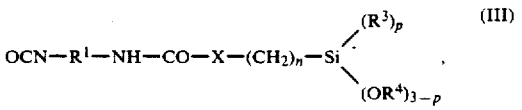

react with the free amino groups or carboxyl groups or a carboxyl groups of a polyamide or carboxyl-terminated polyamide of the formulae:

to form a trialkoxysilane-terminated polyamide of the formula Va or Vb:

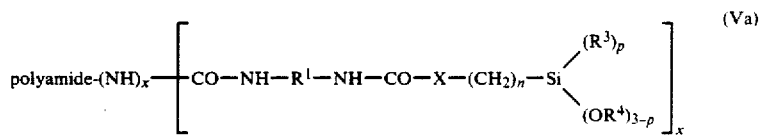

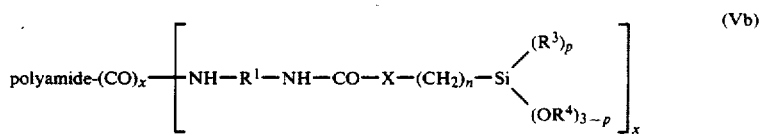

In the above formulas, $R^1$ is $C_5$-$C_{14}$ alkylene, $C_6$-$C_{14}$ arylene, $C_6$-$C_{14}$ diarylene alkyl or dialkylene substituted arylene wherein an aryl refers to phenyl or napthyl and arylene refers to phenylene and naphthylene $R^2$ is hydrogen, $C_1$-$C_4$ alkyl, a $C_6$ substituted $C_{14}$ alkyl substituted phenyl moiety having 1 to 2 $C_1$-$C_4$ alkyl groups, or a radical of the formula

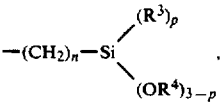

n is a number of 1 to 4, $R^3$ is a $C_1$-$C_4$ alkyl group, $R^4$ is a $C_1$-$C_4$ alkyl or $C_1$-$C_4$ alkoxy-$C_2$-$C_4$-alkylene and p has a value of 0, 1 or 2, X is —$NR_2$— or —S—, x is a number which gives amine or acid values of from 5 to 50 for the polyamides.

Suitable polyamides are homopolyamides, copolyamides, polyamide alloys, such as elastomeric polyamides and polyamides containing thermoplasts. The particularly preferred hotmelt adhesive systems for use in the process of the invention are incorporated herein by reference.

The joint sealing compounds used in another embodiment of the process of the present invention substantially correspond in their chemical structure to the described hotmelts. The joint sealing compounds used in a preferred embodiment of the process of the invention are mixtures with polyurethane prepolymers. These polyurethane prepolymers are obtained by reaction of polyether and/or polyester polyols with di, tri- or polyisocyanates. The polyols and polyisocyanates used are generally the same compounds which are used for preparation of the polyurethane prepolymers for hotmelts. The composition and preparation of polyurethane prepolymers are well known in the art and literature.

In addition to the polyurethane prepolymers, the polyurethane prepolymers, the polyurethane sealing compounds used in the process of the present invention can contain other constituents. Alkyl sulfonic acid esters of phenol and cresol, benzyl butyl phthalate or trioctyl phosphate may be used as plasticizers while polymeric isocyanates, aldimines and ketimines may be used as hardeners. Standard reaction-accelerating catalysts such as dibutyltin dilaurate, diacetate and diversatate and also tin(II) octaoate can be used. In addition, pyrogenic silicas carbon black, calcium carbonate and the like can be used as fillers. The hotmelt materials can contain pigments such as titanium dioxide, iron oxide and carbon black. In addition, substances known as siccatives, stabilizers and primers can be useful in the joint sealing composition.

The bond strength of hotmelt adhesives or joint sealing compositions which post-crosslink inthe presence of moisture is increased in relation to the prior art by addition of activator materials in the process according to the invention when used to bond or seal substrates impermeable to water.

The invention is illustrated by the following preferred embodiments.

EXAMPLE 1

Sand-blasted aluminium test specimens measuring $100 \times 25 \times 2$ mm were used for determining the tensile shear strength of hotmelt bonds. The test specimens were coated with solutions or suspensions containing 0.5 mg of the activator materials (5% activator material in water) and dried in air. The adhesives in an amount of 12.5 milligrams was then applied as a melt. The commercially available product Bostik Supergrip ® 9802 was used as a polyurethane hotmelt. This product has a melt viscosity at 100° C. of 18 Pa.s and an NCO content of 1.8 g NCO/100 g solids. The test specimens were overlapped in an area of 250 mm² and pressed together with 1 N/mm² pressure. The coverage of the test specimen by the activator was about 35%.

After 24 hours, the test speciments were tested to failure in a tension tester and the tensile shear strength determined in accordance with DIN 53 283. The results are shown in Table 1.

TABLE 1

| Activator material | Tensile shear strength at 100° C. (N/mm²) after 24 hours |
|---|---|
| — | 0.3 |
| zeolite A | 2.0 |
| $Na_2CO_3 \times 10\ H_2O$ | 1.1 |
| $CaSO_4 \times 2\ H_2O$ | 1.5 |
| $Ca(CH_3COO)_2 \times 2\ H_2O$ | 1.1 |
| $CuSO_4 \times 5\ H_2O$ | 1.2 |
| $FeSO_4 \times 7\ H_2O$ | 1.1 |
| $Na_2SiO_3 \times 9\ H_2O$ | 1.0 |
| $Mg_3(PO_4)_2 \times 4\ H_2O$ | 1.1 |
| Calcium lactate $\times 5\ H_2O$ | 1.2 |
| $Na_2SO_4 \times 10\ H_2O$ | 0.7 |

— indicates that no activator was applied.

EXAMPLE 2

The effect of the quantity of activator material on tensile shear strength was determined using zeolite A for example. The zeolite A was applied from 5% aqueous suspensions; adhesive, test specimens and test procedure as in Example 1. The results are shown in Table II.

TABLE II

| g Zeolite A (solid)/ m² surface to be bonded | Tensile shear strength at 100° C. (N/mm²) after 24 hours |
|---|---|
| 0 | 0.3 |
| 0.56 | 0.8 |
| 1.6 | 1.5 |
| 3.2 | 1.9 |
| 12 | 2.3 |
| 25 | 2.0 |
| 64 | 0.6 |

EXAMPLE 3

The fixing of the activator material to the substrate was varied by addition of a binder. Zeolite A was used as the activator material and cellulose acetobutyrate as the binder, being applied to the substrate by means of an organic solvent (acetone). Test specimens pressure, overlap and adhesive as in Example 1. The results are shown in Table III.

TABLE III

| Acetone (g) | Activator material Zeolite A (g) | Cellulose acetobutyrate (g) | Tensile shear strength at 100° C. (N/mm²) after 24 h |
|---|---|---|---|
| 99 | 0.1 | 1.0 | 0.7 |
| 98 | 1.0 | 1.0 | 1.3 |
| 94 | 5.0 | 1.0 | 1.8 |
| 89 | 10.0 | 1.0 | 1.4 |

EXAMPLE 4

A polyamide of dimerized fatty acid, azelaic acid, ethylenediamine and piperazine having an amine value of 35 to 50, an acid value below 1 and a melt viscosity of 1.6 Pa.s at 160° C. was modified with an alkoxysilane as described in Example 1 of German patent application P 37 14 763.3. The product was used as an adhesive in the process according to the invention and the effect of the activator material determined by measurement of the thermal stability of the bond under load. To this end, 25 mm wide strips of aluminium (2 mm thick) were bonded with an overlap (25 mm) using as activator material zeolite A applied from a 5% aqueous suspension to which 0.3% methyl cellulose was added in one test. A load of 1.36 kg was applied to the bond parallel to the surface, after which the bond was exposed to a temperature increase of 5° C./10 mins in a recirculating air heating cabinet. The thermal stability under load is defined as that temperature at which the bond still does not melt. The results are shown in Table IV.

TABLE IV

| Activator | Thermal stability under load (°C.) after 24 hours |
|---|---|
| — | 100 |
| Zeolite A | above 200 |
| Zeolite + methyl cellulose | above 200 |

— indicates that no activator was applied.

EXAMPLE 5

To determine the effect of the activator material on the hardening of polyurethane joint sealing compounds, 4 g of a coarse powder of water-saturated zeolite A was spread over the bottom of an aluminium dish (8 cm diameter) and covered with polyurethane joint sealing compound (Sista ® F. 120). The hardening of the joint sealing compound from the bottom of the dish was compared with that of the same joint sealing compound of which the surface is exposed to atmospheric moisture. The results are shown in Table V.

TABLE V

| Time (days) | Layer thickness hardened in the absence of air with activator material | Layer thickness hardened under the effect of atmospheric moisture |
|---|---|---|
| 1 | 2-3 mm | 1-2 mm |
| 2 | 4-5 mm | 4-5 mm |
| 3 | 6 mm | 5-6 mm |
| 4 | 9-10 mm | 7 mm |

EXAMPLE 6

5 g of the anhydrous activator material were powdered and 45 g dried acetone immediately added to the resulting powder. After mixing, the resulting mixture was applied to sand-blasted and degreased aluminium test specimens measuring 100×25×2 mm. After evaporation of the acetone, the test specimens were left standing in air for 1 week and then bonded with a hotmelt (Bostik Supergrip ® 9802). The tensile strengths were determined and are shown in Table VI.

TABLE VI

| Activator Material | Tensile shear strength at 100° C. (N/mm²) after 1 week |
|---|---|
| Zeolite A | 1.7 |
| $CuSO_4$ | 0.9 |
| $Na_2SO_4$ | 1.0 |
| $Na_2CO_3$ | 1.1 |

Since it is generally accepted that surfaces for bonding should be clean and residue free, it is unexpected that the application of the activator materials of the process of the present invention would improve the bonding.

We claim:

1. A process for bonding a substrate, impermeable to water vapor, with a hotmelt material which post-cross-links on contact with moisture which comprises:
    (1) applying a suspension or solution of an activator material in a liquid to at least one substrate surface to be bonded, the activator material being a substance which releases chemically or adsorptively bound water at the temperature of application of the hotmelt material;
    (2) removing the liquid; and
    (3) applying the hotmelt material at its application temperature to the at least one substrate surface.

2. The process of claim 1 wherein the hotmelt material is a hotmelt adhesive and a second substrate is placed over the substrate to which the hot melt is applied and the substrates urged together.

3. The process of claim 1 wherein the hotmelt material is a hotmelt sealant and the hotmelt sealant is applied to a space at least a portion of which is bounded by the at least one substrate surface to which the activator material has been applied.

4. The process of claim 1, 2 or 3 wherein the activator material release from about 0.5 to about 25% by weight of the activator material, of bound water.

5. The process of claim 4 wherein the activator material releases from about 1 to about 10%, by weight of the activator material, of bound water.

6. The process of claim 1, 2 or 3 wherein the activator material is applied to the at least one substrate surface to be bonded so that at least 80% of the surface is not covered by the activator material.

7. The process of claim 6 wherein at least 50% of the at least one substrate surface to be bonded is not covered by the activator material.

8. The process of claim 4 wherein the activator material is applied to the at least one substrate surface to be bonded so that at least about 80% of the surface is not covered by the activator material.

9. The process of claim 8 wherein at least about 50% of the surface is not covered by the activator material.

10. The process of claim 1, 2, or 3 wherein the activator material is an air dried, oxide, hydroxide or salt containing water of crystallization of an alkali metal, alkaline earth metal, or metal of Group IIIA, IB, IIB, IIIB, IVB, VB, VIB, VIIB or VIIIB of the Periodic Chart of Elements, Merck Index, Tenth Edition.

11. The process of claim 4 wherein the activator material is an air dried, oxide, hydroxide or salt containing water of crystallization of an alkali metal, alkaline earth metal, or metal of Group IIIA, IB, IIB, IIIB, IVB, VB, VIB, VIIB or VIIIB of the periodic chart of Elements, Merck Index, Tenth Edition.

12. The process of claim 1, 2 or 3 wherein the activator material is a zeolite.

13. The process of claim 12 wherein the zeolite is zeolite A.

14. The process of claim 10 wherein the activator material is iron sulfate containing water of crystallization or barium hydroxide containing water of crystallization.

15. The process of claim 4 wherein the activator material is a hydrophilic polymer containing bound water.

16. The process of claim 15 wherein the activator material comprises at least one hydrophilic polymer selected from the group consisting of cellulose derivatives, starch derivatives, polyacrylamide and polyvinylpyrrolidone.

17. The process of claim 1, 2 or 3 wherein the activator material is applied to the substrate as a dispersion in water.

18. The process of claim 4 wherein the activator material is applied to the substrate as a dispersion in water.

19. The process of claim 17 wherein the dispersion contains from about 1 to about 90% by weight of activator material.

20. The process of claim 17 wherein the dispersion contains from about 10 to about 50% by weight of activator material.

21. The process of claim 17 wherein the dispersion contains from about from about 10 to about 20% by weight of activator material.

22. The process of claim 18 wherein the dispersion contains from about 10 to about 50% by weight of activator material.

23. The process of claim 22 wherein the dispersion contains from about to 10 to about 20% of activator material.

24. The process of claim 17 wherein the dispersion contains at least one water soluble polymer as a stabilizer for the dispersion.

25. The process of claim 18 wherein the dispersion contains at least one water soluble polymer as a stabilizer for the dispersion.

26. The process of claim 24 wherein the stabilizer comprises at least one polymer selected from the group consisting of cellulose ethers and polyvinyl alcohol.

27. The process of claim 25 wherein the stabilizer comprises at least one polymer selected from the group consisting of cellulose ethers and polyvinyl alcohol.

28. The process of claim 1, 2 or 3 wherein the activator material is applied to the substrate as a dispersion in an organic liquid.

29. The process of claim 28 wherein the organic liquid comprises at least one liquid selected from the group consisting of alcohols containing from 1 to 5 carbon atoms and ketones containing from 3 to 5 carbon atoms.

30. The process of claim 4 wherein the activator material is applied to the substrate as a dispersion in an organic liquid.

31. The process of claim 30 wherein the organic liquid comprises at least one liquid selected from the group consisting of alcohols containing from 1 to 5 carbon atoms and ketones containing from 3 to 5 carbon atoms.

32. The process of claim 28 wherein the dispersion contains at least one organic liquid soluble polymer stabilizer.

33. The process of claim 32 wherein the organic liquid soluble polymer is a cellulose ester.

34. The process of claim 30 wherein the dispersion contains at least one organic liquid soluble polymer stabilizer.

35. The process of claim 34 wherein the organic liquid soluble polymers is a cellulose ester.

36. The process of claim 1, 2 or 3 wherein the hotmelt material comprises at least one thermoplastic polymer selected from the group consisting of isocyanate terminated polymers, silane terminated polymers and siloxane terminated polymers.

37. The process of claim 4 wherein the hotmelt material comprises at least one thermoplastic polymer selected from the group consisting of isocyanate terminated polymers, silane terminated polymers and siloxane terminated polymers.

38. The process of claim 6 wherein the hotmelt material comprises at least one thermoplastic polymer selected from the group consisting of isocyanate terminated polymers, silane terminated polymers and siloxane terminated polymers.

39. The process of claim 8 wherein the hotmelt material comprises at least one thermoplastic polymer selected from the group consisting of isocyanate terminated polymers, silane terminated polymers and siloxane terminated polymers.

40. The process of claim 10 wherein the hotmelt material comprises at least one thermoplastic polymer selected from the group consisting of isocyanate terminated polymers, silane terminated polymers and siloxane terminated polymers.

41. The process of claim 11 wherein the hotmelt material comprises at least one thermoplastic polymer selected from the group consisting of isocyanate terminated polymers, silane terminated polymers and siloxane terminated polymers.

42. The process of claim 12 wherein the hotmelt material comprises at least one thermoplstic polymer selected from the group consisting of isocyanate terminated polymers, silane terminated polymers and siloxane terminated polymers.

43. The process of claim 13 wherein the hotmelt material comprises at least one thermoplastic polymer selected from the group consisting of isocyanate terminated polymers, silane terminated polymers and siloxane terminated polymers.

44. The process of claim 1, 2 or 3 wherein the hotmeltmaterial comprises polyurethane prepolymers.

45. The process of claim 4 wherein the hotmelt material comprises polyurethane prepolymers.

46. The process of claim 10 wherein the metal comprises at least one element selected from the group consisting of copper, iron, vanadum, chromium, molybdenum, tungsten, manganese, cobalt, nickel, zinc, cadmium and aluminum.

47. The process of claim 11 wherein the metal comprises at least one element selected from the group consisting of copper, iron, vanadum, chromium, molybdenum, tungsten, manganese, cobalt, nickel, zinc, cadmium and aluminum.

48. The structure produced by the process of claim 1, 2 or 3.

49. The structure produced by the process of claim 6.

50. The structure produced by the process of claim 10.

51. The structure produced by the process of claim 12.

52. The structure produced by the process of claim 15.

* * * * *

UNITED STATES PATENT AND TRADEMARK OFFICE
CERTIFICATE OF CORRECTION

PATENT NO. : 4,913,969

DATED : April 3, 1990

INVENTOR(S) : Schulte et al.

It is certified that error appears in the above-identified patent and that said Letters Patent is hereby corrected as shown below:

On the face page, at [30], the Foreign Application Priority Data should read --Fed. Rep. of Germany 3723932--.

Signed and Sealed this

Third Day of September, 1991

Attest:

HARRY F. MANBECK, JR.

*Attesting Officer*  *Commissioner of Patents and Trademarks*